Figure 1:
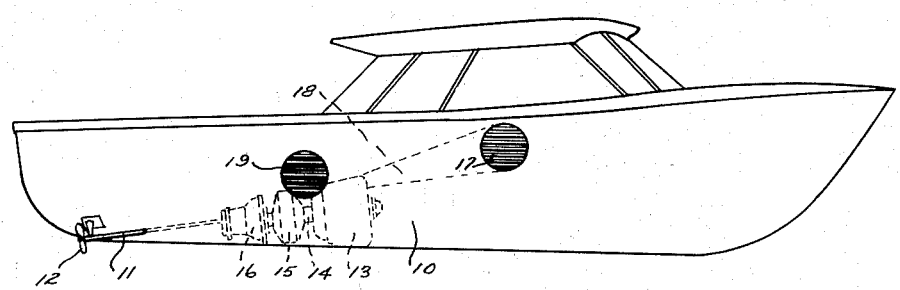

Feb. 15, 1966  J. H. BOOTH  3,234,902
MARINE TURBINE DRIVE SYSTEM
Filed Oct. 8, 1962

INVENTOR.
JAMES H. BOOTH
BY
ATTORNEYS

United States Patent Office 3,234,902
Patented Feb. 15, 1966

3,234,902
MARINE TURBINE DRIVE SYSTEM
James H. Booth, Detroit, Mich., assignor to
TRW Inc., a corporation of Ohio
Filed Oct. 8, 1962, Ser. No. 228,902
2 Claims. (Cl. 115—34)

The present invention relates to marine propulsion system and is, more particularly, concerned with the provision of a substantially improved propulsion system for ships or the like in which high speed performance is improved and, at the same time, maneuverability of the ship during slow speed maneuvers is greatly simplified. In accordance with the present invention a gas turbine or other similar high speed turbine type power source is directly connected to the output propeller shaft by way of a clutch and reversing gear. Additionally, control means is provided, in accordance with the present invention, for limiting the rotational movement of the output shaft under the influence of the power source without requiring immobilization of the power source or the loss of energy built up in the rotational parts of the power source. Instead, in accordance with the present invention, a hydrodynamic fluid brake means is applied to the output stage of turbine or other similar high speed rotary power source to thereby provide a control load against which the turbine may work and against which the turbine may develop an instantly available torque. As a result of the arrangement of the present invention, a high speed rotary source of power, such as for example a gas turbine or the like, may be employed effectively for the production of a high torque, on demand, low speed drive during ship maneuvering, as well as a controllable reserve of torque at any engine speed, power supply tasks heretofore unavailable in maritime operation.

As those skilled in the art of turbine power sources are aware, such turbines comprise a rotary turbine element carrying one or more rows of turbine blades thereon and having a substantial rotational mass. Such turbines are ideally constructed to operate at a substantially constant high speed. Characteristically, such turbines accelerate slowly and have a very poor response to load variations and demands which are reflected in the speed and direction of rotation of the output shaft. However, if the output shaft or turbine of a suitable gas turbine is braked or otherwise loaded, a high torque build up can be provided even though the rotational velocity of the output shaft is zero or substantially less than that of the turbine. This build up of torque comprises, of course, a reserve of power available for instant utilization. As a result of the availability of this reserve of available torque forward and reverse torques may be obtained intermittently even at substantially no hull velocity and substantially instantaneously to provide excellent docking maneuverability under adverse current and/or wind conditions. Additionally, this reserve is available to provide ready torque at higher speeds, such as, for example in landing craft beaching operations, where a reserve of torque is desirable for release at the instant of striking the beach, reef, or other obstruction.

More specifically, in accordance with the present invention, I provide a marine propulsion system employing a gas turbine, or the like, preferably of the turbo-shaft type providing a high speed output shaft of the free power type drivingly clutched through a forward-reverse gear to a propeller shaft. At a point ahead of the clutch and forward-reverse gear, a hydrodynamic brake, or the like, is applied to the turbine power output shaft. In view of the ready availability of cooling water in marine propulsion systems, it is preferred that the brake applied to the turbine output shaft be of the hydrodynamic type employing fresh or salt water as its coolant and as its reaction liquid. The reaction liquid is pumped from the lake or sea, as the case may be, into the hydrodynamic brake under positive pressure developed by a pump directly driven by the turbine output shaft. As a result of this arrangement, control of the turbine output is accomplished without requiring separate auxiliary engines, sources of air under pressure, or electrical motor systems. Further, the heated water may be employed for showers and heating for the cabin, where desired, thereby eliminating separate water heating equipment.

It is, accordingly, an object of the present invention to provide a marine propulsion system employing a gas turbine as a source of power in combination with static energy absorption means for load-controlling the turbine when extremely low speed control of the ship is required.

Another object of the present invention is to provide a gas turbine drive system for marine use in which the relative inflexibility of turbine operation is minimized.

Yet a further object of the invention is the provision of an improved marine propulsion system utilizing simplified controls employing convenient sea or fresh water as a control medium.

A feature of the invention resides in the application of a hydrodynamic kinetic energy absorber for maintaining a load on the gas turbine, or the like, prime mover.

Yet another feature of the invention resides in the provision of a hydrodynamic retarder and loading pump therefor directly series driven by the output shaft of a turbine prime mover and positioned in the drive line ahead of both the drive line clutch and forward-reverse gear unit.

Figure 2:
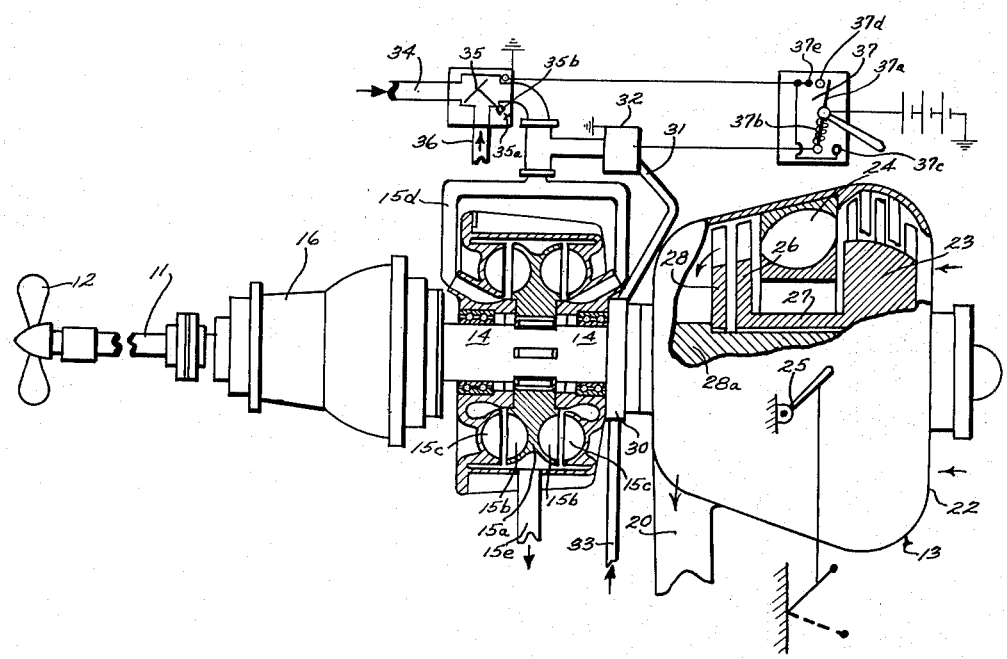

Still other and further objects and features of the present invention will become apparent to those skilled in the art from a consideration of the attached drawings and specification wherein one embodiment of the invention is shown by way of illustration only, and wherein:

FIGURE 1 illustrates, in side-elevation, a boat incorporating the marine propulsion system of the present invention; and FIGURE 2 provides an enlarged schematic illustration of the propulsion system illustrated in FIGURE 1.

As shown on the drawings:

As may be seen from a consideration of FIGURE 1, the present invention is designed for application to an inboard power boat the hull of which is generally indicated at 10. A conventional propeller shaft 11 rotates a conventional propeller 12 and is in turn driven by a turbine the general outline of which is indicated at 13. The output shaft of the turbine 13, indicated at 14, drives the rotor of an hydraulic brake 15 and projects through the brake to drive a forward-reverse transmission 16. In the embodiment illustrated, two propeller shafts 11 are provided one of which is shown and, accordingly, a pair of turbine drive assemblies are employed. While only one may be seen from the side elevation shown in FIGURE 1, it will be understood that both units are identical. In view of the employment of a pair of power plants it is desired that the air inlets to and exhaust from the turbine be provided on the same side of the ship for each unit. Accordingly, it will be observed that an air inlet 17 is provided for directing air via conduit 18 to the inlet of the turbine 13. Similarly, an exhaust element 19 is connected to the exhaust 20 of the turbine. In situations in which a single engine is employed, the exhaust may be on the opposite side of the boat from the inlet.

The operation of the drive system may be more clearly understood from a consideration of FIGURE 2. As there shown, the turbine 13 comprises a forward, inlet area 22 immediately behind which is situated an axial flow compressor 23 which directs compressed air to a combustion chamber 24. Fuel is introduced into the combustion chamber 24 by means of a conventional turbine fuel injection system controlled by throttle 25 and the products of combustion resulting in the combustion chamber 24 drive the gas generator turbine 26 which is drivingly connected to the compressor 23 by means of the sleeve shaft 27. The combustion gases passing through the gas generator turbine 26 continue through the free power turbine 28 which is mounted for driving rotation of shaft 28a which drives shaft 14 through conventional constant ratio reduction gearing of planetary spur gear type, not shown, but is not directly connected in driving relation with the compressor.

As those familiar with the construction of such free power turbine plants are aware, the rotational speed of the free power turbine 28 need not be the same as the rotational speed of the compressor, although in optimum operation, the speeds would approach one another. In view of the fact that acceleration characteristics of gas turbines are notoriously poor, the structure of the present invention provides means for applying a control load to the output shaft 14 of the free power turbine 28 independently of the speed of rotation of the compressor 23 and the gas generator turbine 26. Accordingly, through the opening of the throttle 25 the gas generator turbine 26 and the compressor 23 may be operated at a substantial power level without the application of power to the propeller shaft 11 until such time as the brake 15 is released. When the brake 15 is released the power previously absorbed by it is immediately available as additional torque to the shaft 11 by way of shaft 14. At such time as the brake 15 is applied, shifts may be readily made in the forward-reverse, sliding gear transmission 16 and in view of the substantially instantly available torque, held in check only by the brake 15, forward and reverse maneuvers may readily be accomplished.

The hydrodynamic brake 15 is, per se, of conventional configuration and may comprise, for example, a rotor 15a drivingly connected with shaft 14. The rotor 15a is provided with oppositely facing cups 15b which face cups 15c in a stator rigidly mounted in the boat. At such time as hydraulic liquid is present in the annular areas 15b, 15c, hydrodynamic braking action is accomplished, lowering the rotational speed of the shaft 14 to a negligible velocity under partial throttle conditions of the turbine. The hydrodynamic brake may be of the type illustrated in United States Letters Patent No. 2,963,118. In such a construction, the braking liquid is introduced near the hub of the rotor by conduits 15d and ejected at the outer periphery of the rotor by way of conduit 15e. In order to prime the retarder and to assure very rapid filling thereof, a prime pump 30 of the conventional centrifugal type is directly driven by the shaft 14 and directs its output to conduit 15d by way of a conduit 31 and control valve 32. The pump inlet 33 may conveniently be located below the water line in the ship's hull to employ water. Since the hydrodynamic brake will provide a certain amount of pumping action of its own, additional braking liquid may be introduced by conduit 34, from below the hull water line by way of valve 35 which controls conduit 34 and also conduit 36 leading to an air inlet.

Under ordinary cruising conditions control box 37 is positioned to retain valve 32 closed and valve 35 open to air inlet 36 so that liquid does not circulate in the hydrodynamic brake. Under such circumstances the entire output of the free power turbine 28 is applied directly to the transmission 16 and the power shaft 11. However, upon a desire for slow speed maneuvering, or other operational conditions requiring a ready reserve of torque, the shaft 14 may be effectively retarded by opening valve 32 thereby introducing fluid under pump pressure to the retarder to prime the retarder. For this purpose the valve 32 is, under control of control box 37, held open only briefly, a sufficient time to prime the retarder with liquid. For this purpose a conventional time delay switch is provided in the control box 37 to break the circuit to valve 32 after passage of a few seconds. Simultaneously with breaking of the circuit to valve 32, valve 35 is energized to open conduits 15d to water inlet 34 and to close off air inlet 36. This relationship provides hydraulic liquid to the retarder by the pumping action of the retarder itself. In this operation, the valve 35 may, in its operative position for opening conduit 34 to conduits 15d, retain air inlet 36 open to a small, adjustable, degree to permit a controlled amount of air to enter the system. Such air provides a resiliency in the brake which is desirable. This may be accomplished, for example, by providing a small adjustable stop 35a at the end of valve plate solenoid 35b controlling conduit 36 to prevent its complete closure with movement of the valve plate opening conduit 34. Alternatively, the valve plate 35 can be manually adjusted by a lever, not shown, connected directly to it.

The switch 37 may comprise, as shown, a lever having blades 37a and 37b. Blade 37b is a bimetallic blade which, when moved to complete the circuit in valve 32 as shown in FIGURE 2, heats up after a few seconds and deflects to touch contact 37c energizing valve 35. In neutral position, blade 37a contacts dead contact 37d. When the lever is moved counterclockwise to position blade 37a against contact 37e, the valve 35 is energized to open conduit 34 without time delay and priming.

As a result of the arrangement described, it will be observed that the rotational output of shaft 14 may be accurately controlled by the application of brake 15, independently of the loading of the gas generator turbine 26 and compressor 23 of the turbine. Accordingly, upon release of the brake 15, by closure of valves 35 and 32, the torque developed by the free power turbine 28 is available on demand to the output shaft 14, transmission and clutch 16, and propeller shaft 11. As a result of this instant availability of output power at transmission 16, the boat has maneuverability and exceptional acceleration heretofore unavailable in turbine drive systems for marine operation. These improved characteristics provide versatility coupled with excellent high speed performance resulting from utilization of a turbine as the prime mover. For example, in accordance with the present invention, a gas turbine may be employed as the prime mover for naval vessels such as landing craft where the high speed operation of a turbine is desirable. In accordance with the present invention, however, additional maneuverability is provided. For example, in a landing operation over reefs or similar obstructions, the gas turbine may be operated at substantially full throttle as the reef area is approached, with the hydrodynamic brake partially filled to absorb a portion of the turbine output, thereby providing a reserve of torque as above explained. Upon, or immediately before, striking a below surface obstruction, the brake may be released, providing a surge of torque at the instant it is required for moving the craft over the obstacle. Without the system of the present invention, upon hitting such an obstacle, the low acceleration characteristics of the turbine would eliminate the possibility of sufficient torque to carry the craft over the obstruction or, alternatively, up on to the beach. Furthermore, in beaching operations, where underwater obstructions exist, or in stormy weather, wave conditions are likely. In high wave conditions the propeller shaft of the craft may occasionally be thrown clear of the water. When such an occurrence takes place with a no-load condition on the propeller shaft, the turbine has a tendency to run away. By running the system with the retarder partially loaded, the hydrodynamic brake will prevent such occurrence.

It will be apparent to those skilled in the art from the above description and drawings, that variations and modifications may be made in accordance with the present invention without departing from the scope of the novel concepts thereof. For example, it will be apparent to those familiar with the field, that where marine craft are employed having substantial draft, the pump 30 for priming the retarder may be replaced by a gravity conduit leading to the exterior of the craft. Similarly, a separate pump altogether, such as for example, an electric motor-driven pump, may be employed for priming purposes or for supplying a small trickle of water to the brake for cooling purposes during periods of non-braking function. In view of such apparent modification and others equally as apparent, it is my intention that the scope of the present invention be limited solely by that of the hereinafter appended claims.

I claim as my invention:

1. A marine propulsion system comprising a prime mover having a rotary free power turbine driving an output shaft and a throttle for controlling the application of fluid under pressure to said turbine to cause rotation thereof, a brake on said output shaft, a propeller, a forward-reverse transmission driven by said output shaft and positioned between said propeller and said brake, and means for energizing said brake to retard rotation of said output shaft during operation of said prime mover with said throttle open, said brake comprising a hydrodynamic braking mechanism and said last-named means including means for filling said brake with liquid, said filling means comprising a liquid prime pump driven by said output shaft, pump inlet means in the boat below the waterline, means connecting the outlet of the pump with said hydrodynamic brake and, manually controlled valve means controlling said outlet, said last-named control means having time delay means automatically closing said valve means after a predetermined delay and opening a second source of liquid to the inlet of said hydrodynamic brake.

2. In a marine propulsion system, a gas turbine having an air compressor, a combustion chamber, a throttle controlling the flow of combustible fuel to said combustion chamber, a turbine member driving said compressor and a free power turbine driving an output shaft, a brake on said output shaft, a marine propeller, a forward-reverse transmission connected to said output shaft between said propeller and said brake for transferring the power from said free power turbine to said propeller, and control means operable to apply said brake selectively during periods when said throttle is open, said brake comprising a hydrodynamic brake having a liquid inlet adjacent the axis of rotation thereof and a liquid outlet adjacent the periphery thereof whereby said brake acts to pump liquid from said inlet to said outlet during braking action, prime pump means driven by said output shaft for supplying fluid from below the boat waterline to said brake inlet, control valve means connecting said pump to said inlet, second valve means connecting the inlet of said hydrodynamic brake to a source of water below said waterline and for connecting said inlet to atmosphere, and control means for initially actuating said first control valve and automatically closing said first control valve and at least partially opening said second control valve to permit the flow of water to said hydrodynamic brake inlet.

References Cited by the Examiner
UNITED STATES PATENTS

| | | | |
|---|---|---|---|
| 2,741,351 | 4/1956 | Fletcher et al. | 115—34 X |
| 2,750,009 | 6/1956 | Pohl | 188—90 |
| 2,755,764 | 7/1956 | Alexander | 115—17 |
| 2,963,118 | 12/1960 | Booth et al. | 188—90 |
| 3,024,876 | 3/1962 | Montgomery | 188—90 |
| 3,056,422 | 10/1962 | Abraham | 188—90 |

FERGUS S. MIDDLETON, *Primary Examiner.*